United States Patent Office 3,327,201
Patented June 20, 1967

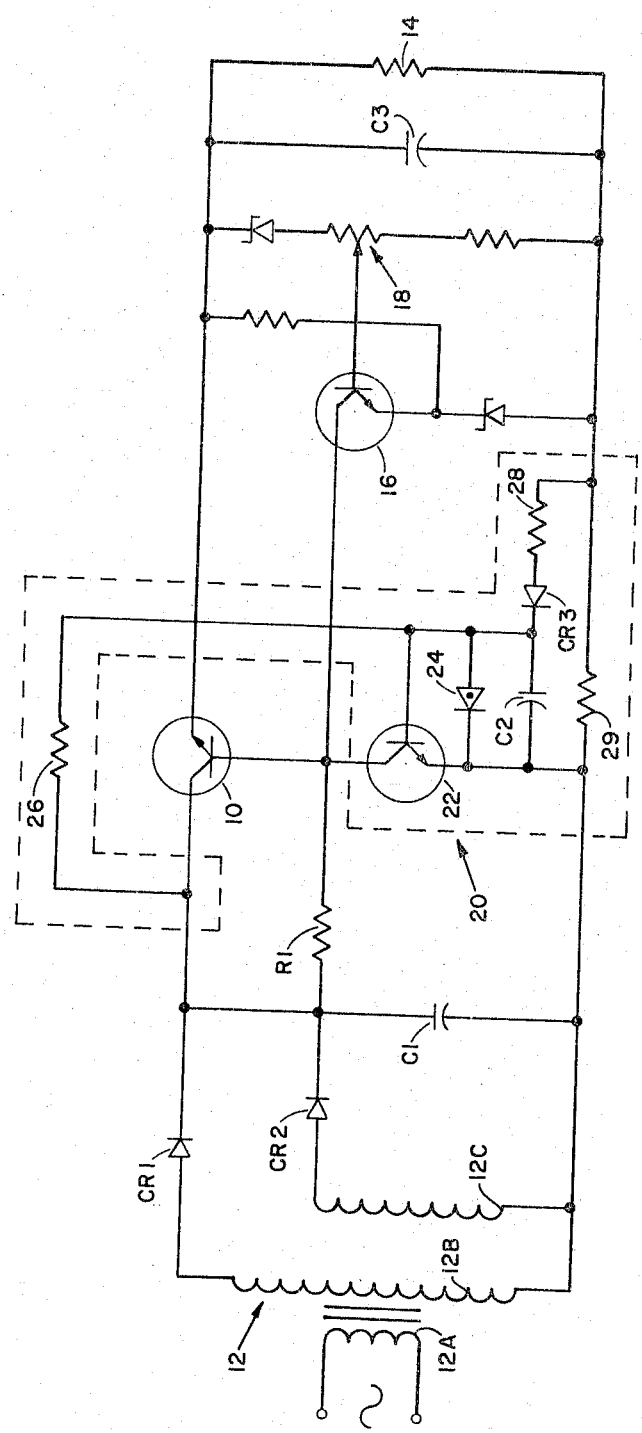

3,327,201
SERIES VOLTAGE REGULATOR WITH
PROTECTION CIRCUIT
Lott W. Brantley, Jr., Arab, Ala., assignor to the United
States of America as represented by the Secretary of
the Army
Filed Dec. 11, 1963, Ser. No. 329,930
2 Claims. (Cl. 323—9)

The invention described herein may be manufactured and used by or for the Government for governmental purposes without the payment of any royalty thereon.

The present invention relates to series voltage regulators and more particularly to a series regulator overload and short circuit protection circuit.

Previous inventions in the field of series regulator protection consist of elaborate circuits requiring many components to accomplish this task. Several circuits in use only limit the current to a certain value, as the output load approaches a short, the entire supply voltage is dropped across the regulator which results in excessive power being dissipated in the regulator.

The present invention overcomes the above disadvantage by utilizing the electrical characteristics of a tunnel diode used in conjunction with a switching transistor. Briefly, the present invention includes a tunnel diode connected in shunt with the base-emitter electrodes of a switching transistor which is connected in series with the base of a series regulator transistor.

Accordingly, it is an object of this invention to provide an improved voltage regulator protection circuit.

Another object of this invention is to provide a means for protecting a regulator against overload and short circuit currents.

A still further object of this invention is to utilize the negative resistance characteristic of a tunnel diode to protect a transistor against damage.

These and other objects and features of the present invention will become apparent when considered in light of the following specification and drawing wherein the single figure is a schematic representation of a preferred embodiment of the invention.

Transistor 10 operates as a series regulator to control current flow from a transformer 12 to a load 14. Transformer 12 consists of a primary winding 12A and secondary windings 12B and 12C. One side of winding 12B is common with one side of winding 12C. The other side of winding 12B is connected to the anode of a first diode rectifier CR1. The other side of winding 12C is connected to the anode of a second diode rectifier CR2. The cathodes of diodes CR1 and CR2 are connected together and are connected through a capacitor C1 to the common side of transformer windings 12B and 12C. The diodes provide a unilateral current output from transformer 12, and capacitor C1 reduces the output ripple by passing the alternating current component. The cathode of diode CR1 is connected to the collector of transistor 10 and through a current limiting resistor $R_1$ to the base of transistor 10 and the collectors of transistors 16 and 22. The common side of transformer windings 12B and 12C are connected to the emitter of transistor 22. Transistor 10 is controlled in a conventional manner by a regulator circuit including transistor 16, potentiometer 18 and their associated components.

Protection circuit 20 includes switching transistor 22 and a tunnel diode 24.

The tunnel diode is connected in shunt with the base-emitter circuit of transistor 22 whereby small currents will not turn transistor 22 on. The anode of diode 24 is connected to the base of transistor 22 and the cathode of diode 24 is connected to the emitter of transistor 22. The junction between the tunnel diode and the base of transistor 22 is connected through resistor 26 to the collector of transistor 10. This junction is also connected to the load circuit through diode CR3 and resistor 28 for sampling the load current. A capacitor C2 is connected in shunt with tunnel diode 24. The resistance-capacitance time constant of resistor 28 and capacitor C2 prevents conduction of transistor 22 during the turn-on time of the circuit. When power is initially supplied to the circuit a capacitance C3 appears momentarily as a short circuit, which causes a large transient pulse to develop; this would activate protection circuit 20 in the absence of the time delay circuit comprising resistor 28 and capacitor C2. This resistance-capacitance network is connected in parallel with a resistor 29 which is in series with the load 14 and transformer 12.

In the operation of the circuit transistor 10 operates as a series regulator controlled by transistor 16 and associated components. As voltage across load 14 varies, the potential at potentiometer 18 varies. This variation increases or decreases the current flow through transistor 16, which in turn changes the potential at the base of transistor 10 and thereby causes the emitter output of transistor 10 to decrease or increase. A positive voltage increase at potentiometer 18 causes transistor 16 to increase conduction. Increased conduction in transistor 16 causes the base voltage on transistor 10 to become more negative. Transistor 10 will decrease collector-to-emitter current proportionally. Similarly, a positive voltage decrease at potentiometer 18 results in increased current flow through transistor 10. This feature allows load regulation. When a situation occurs causing the load current to exceed an acceptable maximum value protection circuit 20 switches transistor 10 off and the output voltage and current drop to zero. A trickle current, from the collector of transistor 10, is supplied through resistor 26 to the base of transistor 22. This current is shunted around transistor 22 through tunnel diode 24. As the load current increases toward the maximum acceptable value, additional current is supplied through resistor 28 and diode CR3 to the tunnel diode. When the total of the trickle current and the additional current exceeds the trigger current of the tunnel diode, the voltage on the base of transistor 22 rises immediately. Transistor 22 turns on thereby switching the voltage on the base of transistor 10 off. The additional current through resistor 28 and diode CR3 is eliminated when the series regulator turns off, however, the trickle current through resistor 26 is sufficient to keep transistor 22 turned on since the tunnel diode no longer shunts the current to ground. The trickle current will also maintain tunnel diode 24 in a high impedance state. To reset the circuit, the input must be turned off, then back on.

In the event of an increased load or open circuit the voltage protection circuit comprising transistor 16 limits the output current to a minimum. In the event of a decreased load or short circuit, protection circuit 20 will turn regulator 10 off and thereby remove load current.

While this invention has been described with references to a preferred embodiment thereof, it will be apparent that various modifications and other embodiments will occur to those skilled in the art within the scope of the invention. Accordingly, I desire the scope of my invention to be limited only by the appended claims.

I claim:
1. A voltage regulator comprising: an unregulated voltage source having first and second output terminals; a first transistor having base, emitter, and collector electrodes, said collector being connected to said first terminal of said source; a load connected in series with the second terminal of said source and the emitter electrode of said first transistor; means connected across said load and to the base of said first transistor for controlling said first transistor in response to the voltage level across said load; a protection circuit for protecting said transistor against damage from over load and short circuit currents, said protection circuit including a second transistor having base, emitter and collector electrodes, the emitter and collector electrodes being connected between the base of said first transistor and the second terminal of said source, and a tunnel diode connected between the base of said second transistor and the second terminal of said source; means for supplying a trickle current to the base of said second transistor; and a load current sampling means comprising a first resistor connected in series with said load and the second terminal of said source, and a second resistor and a capacitor connected in series with each other and in parallel with said first resistor, and wherein said capacitor is connected in parallel with said tunnel diode.

2. A voltage regulator as set forth in claim 1 wherein said trickle current supply means comprises a third resistor connected between the collector of said first transistor and the base of said second transistor.

References Cited

UNITED STATES PATENTS

| | | | |
|---|---|---|---|
| 3,123,759 | 3/1964 | Grey | 320—40 |
| 3,151,289 | 9/1964 | Harpley. | |
| 3,173,078 | 3/1965 | Farnsworth | 323—9 |
| 3,204,174 | 8/1965 | Clerc. | |
| 3,252,086 | 5/1966 | Lundstrom. | |

JOHN F. COUCH, *Primary Examiner.*

W. E. RAY, W. H. BEHA, *Assistant Examiners.*